United States Patent
Fu et al.

(10) Patent No.: US 12,256,033 B2
(45) Date of Patent: Mar. 18, 2025

(54) SYNCHRONIZATION MECHANISM AND FOLDABLE TERMINAL

(71) Applicant: Honor Device Co., Ltd., Shenzhen (CN)

(72) Inventors: Zhenbiao Fu, Shenzhen (CN); Yaolei Zhang, Shenzhen (CN); Haifei Li, Shenzhen (CN); Mingqian Gao, Shenzhen (CN); Bin Yan, Shenzhen (CN); Guotong Zhou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/793,135

(22) PCT Filed: Jan. 29, 2022

(86) PCT No.: PCT/CN2022/075014
§ 371 (c)(1),
(2) Date: Jul. 15, 2022

(87) PCT Pub. No.: WO2022/183880
PCT Pub. Date: Sep. 9, 2022

(65) Prior Publication Data
US 2024/0179229 A1 May 30, 2024

(30) Foreign Application Priority Data

Mar. 1, 2021 (CN) .......................... 202110227044.8

(51) Int. Cl.
*H04M 1/02* (2006.01)
(52) U.S. Cl.
CPC ......... *H04M 1/0268* (2013.01); *H04M 1/022* (2013.01)

(58) Field of Classification Search
CPC .. H04M 1/0268; H04M 1/022; H04M 1/0216; H04M 1/0206–0268;
(Continued)

(56) References Cited

U.S. PATENT DOCUMENTS 5,090,267 A * 2/1992 Gramling ................ F16H 1/225
74/427
9,464,471 B1 * 10/2016 Chen ...................... G06F 1/1681
(Continued)

FOREIGN PATENT DOCUMENTS

CN 105465161 A 4/2016
CN 105650106 A 6/2016
(Continued)

*Primary Examiner* — Ronald Eisner
(74) *Attorney, Agent, or Firm* — Leydig, Voit & Mayer, Ltd.

(57) ABSTRACT

Disclosed are a synchronization mechanism and a foldable terminal. In the synchronization mechanism, a first rotating component and a second rotating component are in transmission connection by using a first worm, a worm gear, and a second worm that are sequentially meshed, thereby implementing the synchronous rotation of the first rotating component and the second rotating component relative to a base. In addition, when the synchronization mechanism is applied to the foldable terminal, since an axial direction of the worm gear and a radial direction of the first worm and the second worm are consistent with a thickness direction of the body, and an axial size of the worm gear and radial sizes of the first worm and the second worm are relatively small, which is conducive to the light and thin design of the foldable terminal.

10 Claims, 9 Drawing Sheets

(58) Field of Classification Search
CPC ............... G06F 1/1616; G06F 1/1681; G06F 1/1613–1681
See application file for complete search history.

(56) References Cited

U.S. PATENT DOCUMENTS

| | | | |
|---|---|---|---|
| 9,611,680 | B2 | 4/2017 | Xu |
| 10,524,564 | B1* | 1/2020 | Wu ................ A47B 9/20 |
| 2004/0092355 | A1* | 5/2004 | Fleytman ........ B60K 23/0808 |
| | | | 475/210 |
| 2004/0158845 | A1* | 8/2004 | Iwaasa ............ G11B 17/056 |
| | | | 720/605 |
| 2007/0125000 | A1* | 6/2007 | Fenelon ............ E05F 15/41 |
| | | | 49/375 |
| 2007/0227279 | A1* | 10/2007 | Watanabe ........ B62D 5/0409 |
| | | | 74/89.14 |
| 2007/0240963 | A1* | 10/2007 | Kosugi ............ B62K 11/14 |
| | | | 192/30 W |
| 2008/0278404 | A1* | 11/2008 | Blalock ............ H01Q 1/125 |
| | | | 343/882 |
| 2011/0249439 | A1* | 10/2011 | Chen ............... F21V 21/30 |
| | | | 362/249.1 |
| 2015/0159413 | A1* | 6/2015 | Chen ............... G06F 1/1681 |
| | | | 16/342 |
| 2015/0267450 | A1* | 9/2015 | Chiang ............ G06F 1/1681 |
| | | | 16/354 |
| 2015/0342068 | A1* | 11/2015 | Su ................... H04M 1/022 |
| | | | 16/354 |
| 2016/0060927 | A1* | 3/2016 | Xu ................... G06F 1/1681 |
| | | | 361/679.55 |
| 2017/0192467 | A1* | 7/2017 | Holung ............ G06F 1/1681 |
| 2020/0197193 | A1* | 6/2020 | Byrne ............... B25J 9/126 |
| 2020/0291681 | A1* | 9/2020 | Markanday ...... B60R 25/02156 |
| 2021/0034116 | A1* | 2/2021 | Torres ............ G06F 1/1681 |
| 2021/0076511 | A1* | 3/2021 | Yang ............... H05K 5/0226 |
| 2021/0096600 | A1* | 4/2021 | Soh ................ H04M 1/0268 |
| 2022/0086265 | A1 | 3/2022 | Shang |
| 2022/0397943 | A1* | 12/2022 | Hsiang ............ G06F 1/1681 |
| 2023/0118440 | A1* | 4/2023 | Lee ................ G06F 1/1652 |
| | | | 361/807 |

FOREIGN PATENT DOCUMENTS

| | | |
|---|---|---|
| CN | 105979032 A | 9/2016 |
| CN | 205622674 U | 10/2016 |
| CN | 107288993 A | 10/2017 |
| CN | 110332217 A | 10/2019 |
| CN | 209472651 U | 10/2019 |
| CN | 110714978 A | 1/2020 |
| CN | 110769089 A | 2/2020 |
| CN | 210715756 U | 6/2020 |
| CN | 211371007 U | 8/2020 |
| CN | 112019662 A | 12/2020 |
| CN | 113890910 A | 1/2022 |
| WO | 2020147633 A1 | 7/2020 |

* cited by examiner

SYNCHRONIZATION MECHANISM AND FOLDABLE TERMINAL

CROSS-REFERENCE TO RELATED APPLICATIONS

This application is a National Stage of International Application No. PCT/CN2022/075014, filed on Jan. 29, 2022, which claims priority to Chinese Patent Application No. 202110227044.8, filed on Mar. 1, 2021, both of which are hereby incorporated by reference in their entireties.

TECHNICAL FIELD

This application relates to the field of electronic device technologies, and in particular, to a synchronization mechanism and a foldable terminal.

BACKGROUND

In recent years, with the development of flexible screen technologies, foldable terminals are increasingly widely applied. A basic architecture of a foldable terminal includes a base, two bodies, and a flexible screen covering the two bodies, where the two bodies can rotate synchronously relative to the base.

To implement the synchronous rotation of the two bodies, four gears meshed with each other are mounted on the base in the related art, and the two bodies are respectively fixedly connected to rotating shafts of the first and last two gears among the four gears. In this way, when one body rotates relative to the base, the body can drive, through the gears meshed with each other, the other body to rotate synchronously relative to the base.

However, the gears are used, and a radial direction of the gears is consistent with a thickness direction of the body. Therefore, to mount the gears with relatively large radial sizes, the thickness of the body is also relatively large, which is not conducive to the light and thin design of the foldable terminal.

SUMMARY

Embodiments of this application provide a synchronization mechanism and a foldable terminal. The synchronization mechanism adopts a first worm, a worm gear, and a second worm as a transmission mechanism between a first rotating component and a second rotating component, to implement synchronous rotation of the first rotating component and the second rotating component. In addition, when being applied to the foldable terminal, the synchronization mechanism is conducive to the light and thin design of the foldable terminal. The technical solutions of the synchronization mechanism and the foldable terminal are as follows:

According to a first aspect, a synchronization mechanism is provided. The synchronization mechanism includes a base, a worm gear, a first worm, a second worm, a first rotating component, and a second rotating component. The worm gear, the first worm, and the second worm are all rotatably connected to the base, and the first worm and the second worm are parallel and are both meshed with the worm gear. The first rotating component is fixedly connected to the first worm, and the second rotating component is fixedly connected to the second worm. The worm gear, the first worm, and the second worm are configured to enable the first rotating component and the second rotating component to rotate synchronously relative to the base.

The synchronization mechanism provided in the embodiments of this application can be applied to any apparatus with synchronous rotation requirements, for example, applied to a foldable terminal, but is not limited thereto.

The base is configured for mounting the worm gear, the first worm, and the second worm.

The worm gear, the first worm, and the second worm constitute a transmission mechanism between the first rotating component and the second rotating component, so that the first rotating component and the second rotating component rotate synchronously. The types of the worm gear, the first worm, and the second worm are not limited in the embodiments of this application. For example, the first worm and the second worm may be cylindrical worms, toroidal worms, or conical worms.

The first rotating component is fixedly connected to the first worm, and the second rotating component is fixedly connected to the second worm. Due to the existence of the worm gear, the first worm, and the second worm, when rotating relative to the base, the first rotating component and the second rotating component certainly rotate synchronously.

According to the solutions in the embodiments of this application, the first worm, the worm gear, and the second worm that are meshed with each other are used as the transmission mechanism between the first rotating component and the second rotating component, so that when the first rotating component rotates, the first rotating component drives the first worm to rotate, the first worm drives the worm gear to rotate, the worm gear drives the second worm to rotate, and the second worm drives the second rotating component to rotate (the same is true when the second rotating component rotates), thereby implementing the synchronous rotation of the first rotating component and the second rotating component relative to the base.

In addition, when the synchronization mechanism provided in the embodiments of this application is applied to the foldable terminal, since an axial direction of the worm gear and a radial direction of the first worm and the second worm are consistent with a thickness direction of the body, and an axial size of the worm gear and radial sizes of the first worm and the second worm are relatively small, the synchronization mechanism does not lead to an excessively large thickness of the body, which is conducive to the light and thin design of the foldable terminal.

In a possible implementation, the worm gear includes a worm gear body portion and a rotating shaft portion. The rotating shaft portion is coaxially and fixedly connected to the worm gear body portion, and two ends of the rotating shaft portion protrude relative to two sides of the worm gear body portion. The two ends of the rotating shaft portion are rotatably connected to the base respectively.

According to the solutions in the embodiments of this application, the worm gear body portion and the rotating shaft portion are fixedly connected, to facilitate the miniaturized design of the worm gear, which is more conducive to saving the space occupied by the worm gear.

In a possible implementation, the base includes a pedestal and a shaft cover, and the pedestal is fixedly connected to the shaft cover. The worm gear body portion is located between the pedestal and the shaft cover, and the two ends of the rotating shaft portion are rotatably connected to the pedestal and the shaft cover respectively. An annular groove is provided on a side of the worm gear body portion facing the shaft cover, the annular groove is coaxial with the rotating shaft portion, an annular flange is provided on a side of the shaft cover facing the worm gear body portion, and the annular flange is located in the annular groove.

According to the solutions in the embodiments of this application, the annular groove is provided on the worm gear body portion, the annular flange is provided on the shaft cover, and the annular flange is located in the annular groove, so that a side of the worm gear is axially limited. Moreover, this limiting manner further saves the thickness space of the body while ensuring the minimum thickness of the shaft cover.

In a possible implementation, a boss is provided on a side of the worm gear body portion facing the pedestal, the boss is coaxial with the rotating shaft portion, a limiting groove is provided on a side of the pedestal facing the worm gear body portion, and the boss is located in the limiting groove.

According to the solutions in the embodiments of this application, in practical applications, since the annular groove is provided on the side of the worm gear body portion facing the shaft cover, in order to avoid further weakening the strength of the worm gear, and considering that the thickness of the pedestal is generally large, the boss may be provided on the side of the worm gear body portion facing the pedestal, and the limiting groove is provided on the pedestal, to axially limit the other side of the worm gear.

In a possible implementation, the first worm and the second worm each include a first rotating connection portion, a spiral portion, a non-circular shaft portion, and a second rotating connection portion that are sequentially connected. The first rotating connection portion and the second rotating connection portion are rotatably connected to the base respectively, the spiral portion is meshed with the worm gear, and the non-circular shaft portion is fixedly connected to the first rotating component or the second rotating component.

According to the solutions in the embodiments of this application, the first worm and the second worm are each provided with a non-circular shaft portion, which facilitates the circumferential limit of the first rotating component and the first worm, and the circumferential limit of the second rotating component and the second worm.

In a possible implementation, spiral angles of the worm gear, the first worm, and the second worm are greater than a first angle threshold and less than a second angle threshold, to enable the first rotating component and the second rotating component to rotate synchronously relative to the base regardless of whether the synchronization mechanism is in a first working condition, a second working condition, or a third working condition.

The first working condition is a working condition in which the first rotating component and the second rotating component are simultaneously rotated by a driving force, the second working condition is a working condition in which the base is not fixed, one of the first rotating component and the second rotating component is fixed, and the other is rotated by a driving force, and the third working condition is a working condition in which the base is fixed, and any one of the first rotating component or the second rotating component is rotated by a driving force.

According to the solutions in the embodiments of this application, on a transmission route of the first worm, the worm gear, and the second worm, there is a case that the worm gear acts as a driving element to drive the first worm or the second worm. Therefore, the transmission mechanism may be self-locked, causing the transmission route to be interrupted. An intuitive consequence is that when a user drives the first rotating component or the second rotating component alone, the entire synchronization mechanism is stuck.

The three possible working conditions are analyzed below:

The first working condition is that the first rotating component and the second rotating component are simultaneously rotated by a driving force. In this working condition, the worm gear only rotates as a driven member. Therefore, self-locking does not occur.

The second working condition is that the base is not fixed, one of the first rotating component and the second rotating component is fixed, and the other is rotated by a driving force. In an example where the first rotating component is rotated by a driving force and the second rotating component is fixed, the first rotating component drives the first worm to rotate, and the first worm drives the worm gear to rotate. Since the second rotating component is fixed, the worm gear cannot drive the second worm to rotate, but drives the base to rotate around the second worm during rotation, thereby also implementing the synchronous rotation of the first rotating component and the second rotating component relative to the base. Since there is a case that the worm gear revolves around the worm in the second working condition, self-locking may occur.

The third working condition is that the base is fixed, and any one of the first rotating component or the second rotating component is rotated by a driving force. In an example where the first rotating component is rotated by a driving force, the first rotating component drives the first worm to rotate, the first worm drives the worm gear to rotate, the worm gear drives the second worm to rotate, and the second worm drives the second rotating component to rotate, thereby implementing the synchronous rotation of the first rotating component and the second rotating component relative to the base. Since there is a case that the worm gear drives the worm in the third working condition, self-locking may occur.

To avoid self-locking in the second working condition and the third working condition, in the embodiments of this application, the spiral angles of the first worm, the worm gear, and the second worm are limited between the first angle threshold and the second angle threshold, so that the synchronization mechanism can implement the synchronous rotation of the first rotating component and the second rotating component relative to the base in any working condition.

In a possible implementation, the first angle threshold is 8.63°, and the second angle threshold is 78.67°.

In a possible implementation, the spiral angles of the worm gear, the first worm, and the second worm are greater than a third angle threshold and less than the second angle threshold, so that a driving force during rotation of the first rotating component or the second rotating component is less than a set value, for example, 5N, in the first working condition, the second working condition, or the third working condition, where the third angle threshold is greater than the first angle threshold.

According to the solutions in the embodiments of this application, when the synchronization mechanism is applied to the foldable terminal, in order to improve the handfeel experience for the user, the spiral angles of the worm gear, the first worm, and the second worm may be further limited between the third angle threshold and the second angle threshold, so that a driving force is less than the set value, for example, 5N, when the user drives the first rotating component or the second rotating component to rotate.

In a possible implementation, the third angle threshold is 17.01°.

According to a second aspect, a foldable terminal is provided. The foldable terminal includes a first body, a second body, a flexible screen, and the synchronization mechanism according to any one of the first aspect. The first body and the second body are respectively connected to the first rotating component and the second rotating component in the synchronization mechanism. The flexible screen covers the first body and the second body.

The foldable terminal provided in the embodiments of this application may be a foldable mobile phone, a foldable tablet computer, or a foldable notebook computer, but is not limited thereto.

According to the solutions in the embodiments of this application, the synchronization mechanism provided in the embodiments of this application is applied to the foldable terminal, which is conducive to the light and thin design of the foldable terminal.

In a possible implementation, there are a plurality of synchronization mechanisms. Axes of the first worms in the plurality of synchronization mechanisms are all collinear, and axes of the second worms in the plurality of synchronization mechanisms are all collinear. The first rotating components in the plurality of synchronization mechanisms are all connected to the first body, and the second rotating components in the plurality of synchronization mechanisms are all connected to the second body.

According to the solutions in the embodiments of this application, a plurality of synchronization mechanisms are arranged, so that the transmission between the first body and the second body is more stable.

For example, the foldable terminal may include two synchronization mechanisms, and the two synchronization mechanisms share a base. The base may be strip-shaped. The two synchronization mechanisms are arranged along a length direction of the base, and are respectively close to two ends of the base.

The technical solutions provided in the embodiments of this application include the following beneficial effects:

The embodiments of this application provide a synchronization mechanism. The synchronization mechanism includes a base, a worm gear, a first worm, a second worm, a first rotating component, and a second rotating component. The first rotating component and the second rotating component are in transmission connection by using the first worm, the worm gear, and the second worm that are sequentially meshed. When the first rotating component rotates, the first rotating component drives the first worm to rotate, the first worm drives the worm gear to rotate, the worm gear drives the second worm to rotate, and the second worm drives the second rotating component to rotate, thereby implementing the synchronous rotation of the first rotating component and the second rotating component relative to the base.

In addition, when the synchronization mechanism is applied to the foldable terminal, since an axial direction of the worm gear and a radial direction of the first worm and the second worm are consistent with a thickness direction of the body, and an axial size of the worm gear and radial sizes of the first worm and the second worm are relatively small, the thickness of the body is not too large, which is conducive to the light and thin design of the foldable terminal.

ILLUSTRATION OF THE DRAWINGS

1: Base, 11: Pedestal, 111: Limiting groove, 12: Shaft cover, 121: Annular flange, 13: First worm shaft seat, 14: Second worm shaft seat, 15: End cover;
2: Worm gear, 21: Worm gear body portion, 211: Annular groove, 212: Boss, 22: Rotating shaft portion;
3: First worm;
4: Second worm;
31: First rotating connection portion, 32: Spiral portion, 33: Non-circular shaft portion, 34: Second rotating connection portion;
5: First rotating component;
6: Second rotating component;
7: First body: and
8: Second body.

DESCRIPTION OF EMBODIMENTS

In recent years, with the development of flexible screen technologies, foldable terminals are increasingly applied. A foldable terminal is in a folded state when being carried, which is convenient to carry and can be better protected: and the foldable terminal is in an unfolded state when being used, to achieve the effect of double screen display. Since a flexible screen is a continuous screen, a synchronization mechanism often needs to be disposed in a base to cause a left body and a right body to rotate synchronously, to implement the unfolding and folding of the flexible screen. However, the synchronization mechanism in the related art leads to an excessively large thickness of the body of the foldable terminal, which is not conducive to the thin and light design of the foldable terminal.

In view of this, the embodiments of this application provide a synchronization mechanism. The synchronization mechanism may be applied to a foldable terminal without occupying a large thickness space of the body, which is conducive to the light and thin design of the foldable terminal.

Figure 1:
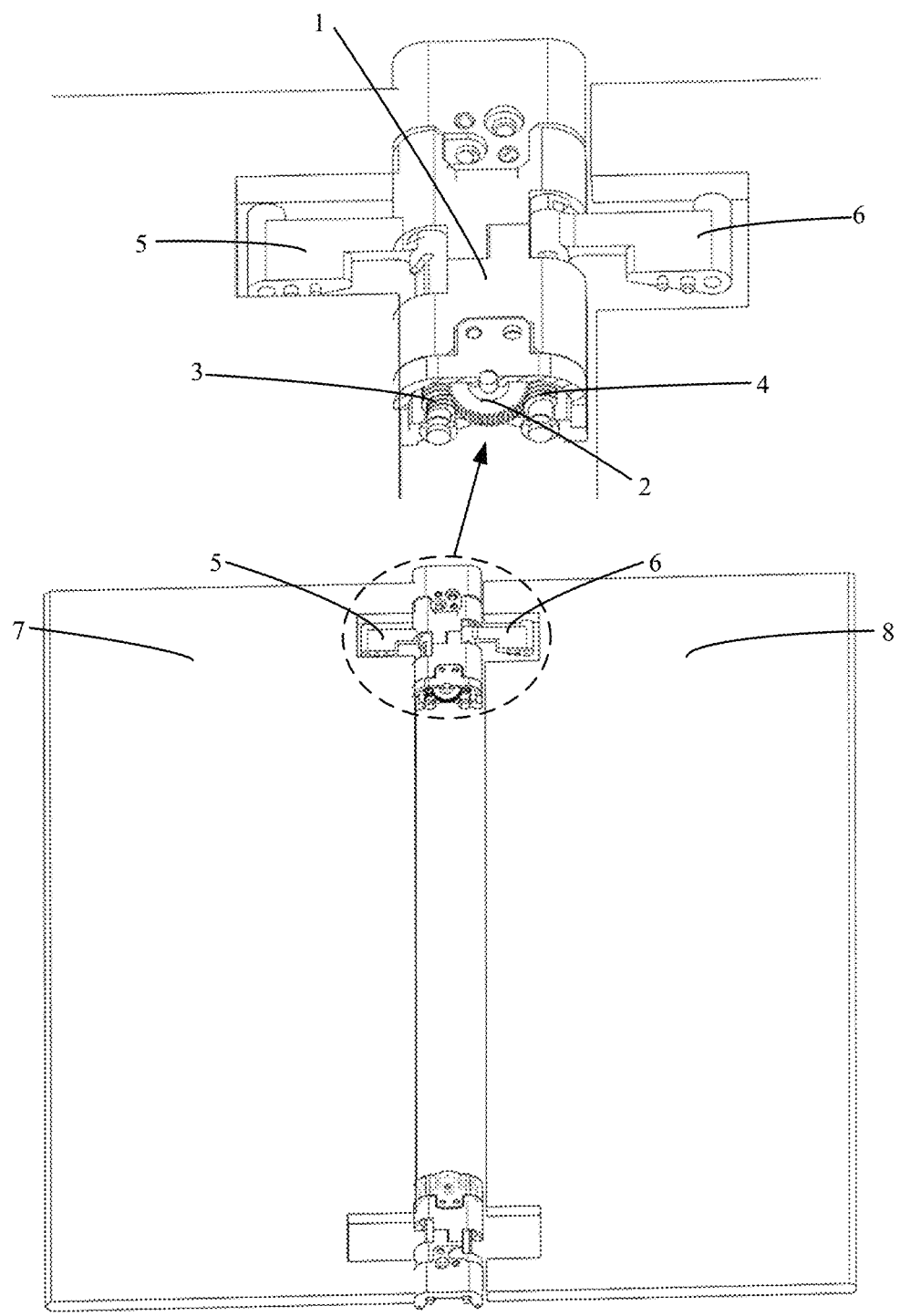
FIG. 1 is a schematic diagram of a foldable terminal and a synchronization mechanism according to an embodiment of this application.

FIG. 1 is a schematic diagram of a foldable terminal including a synchronization mechanism provided in the embodiments of this application. Two sides of the synchronization mechanism are respectively connected to the two bodies of the foldable terminal, so that the two bodies can be unfolded and folded synchronously. Certainly, the synchronization mechanism provided in the embodiments of this application can alternatively be applied to any other apparatuses with synchronous rotation requirements, and is not limited to a foldable terminal.

Figure 2:
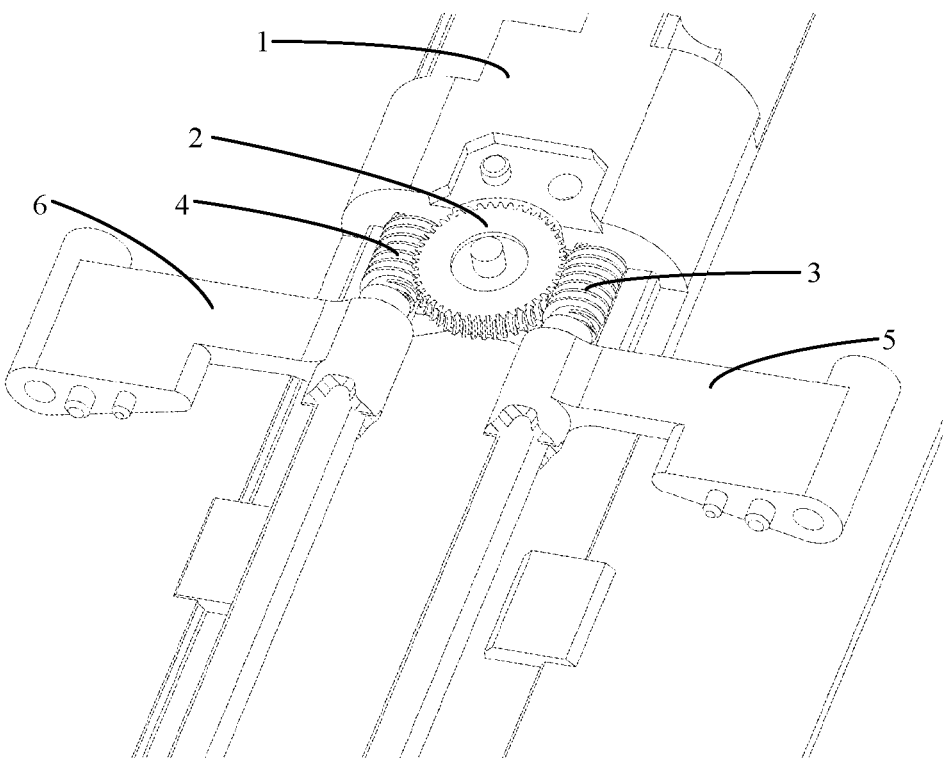
FIG. 2 is a schematic diagram of a synchronization mechanism according to an embodiment of this application.

As shown in FIG. 1 and FIG. 2, the synchronization mechanism includes a base 1, a worm gear 2, a first worm 3, a second worm 4, a first rotating component 5, and a second rotating component 6. The worm gear 2, the first worm 3, and the second worm 4 are all rotatably connected to the base 1, and the first worm 3 and the second worm 4 are parallel and are both meshed with the worm gear 2. The first rotating component 5 is fixedly connected to the first worm 3, and the second rotating component 6 is fixedly connected to the second worm 4. The worm gear 2, the first worm 3, and the second worm 4 are configured to enable the first rotating component 5 and the second rotating component 6 to rotate synchronously relative to the base 1.

The base 1 is configured for mounting the worm gear 2, the first worm 3, and the second worm 4.

The worm gear 2, the first worm 3, and the second worm 4 constitute a transmission mechanism between the first rotating component 5 and the second rotating component 6, so that the first rotating component 5 and the second rotating component 6 rotate synchronously. The types of the worm gear 2, the first worm 3, and the second worm 4 are not limited in the embodiments of this application. For example, the first worm 3 and the second worm 4 may be cylindrical worms, toroidal worms, or conical worms.

The first rotating component 5 is fixedly connected to the first worm 3, and the second rotating component 6 is fixedly connected to the second worm 4. Due to the existence of the worm gear 2, the first worm 3, and the second worm 4, when rotating relative to the base 1, the first rotating component 5 and the second rotating component 6 certainly rotate synchronously. As shown in FIG. 1, when the synchronization mechanism is applied to the foldable terminal, the first rotating component 5 in the synchronization mechanism is connected to a first body 7 of the foldable terminal, and the second rotating component 6 is connected to a second body 8, so that the first body 7 and the second body 8 can rotate synchronously relative to the base 1.

According to the solutions in the embodiments of this application, the first worm 3, the worm gear 2, and the second worm 4 that are meshed with each other are used as the transmission mechanism between the first rotating component 5 and the second rotating component 6, so that when the first rotating component 5 rotates, the first rotating component 5 drives the first worm 3 to rotate, the first worm 3 drives the worm gear 2 to rotate, the worm gear 2 drives the second worm 4 to rotate, and the second worm 4 drives the second rotating component 6 to rotate (the same is true when the second rotating component 6 rotates), thereby implementing the synchronous rotation of the first rotating component 5 and the second rotating component 6 relative to the base 1.

In addition, when the synchronization mechanism provided in the embodiments of this application is applied to the foldable terminal, since an axial direction of the worm gear 2 and a radial direction of the first worm 3 and the second worm 4 are consistent with a thickness direction of the body, and an axial size of the worm gear 2 and radial sizes of the first worm 3 and the second worm 4 are relatively small, the synchronization mechanism provided in the embodiments of this application does not lead to an excessively large thickness of the body, which is conducive to the light and thin design of the foldable terminal.

Figure 3:
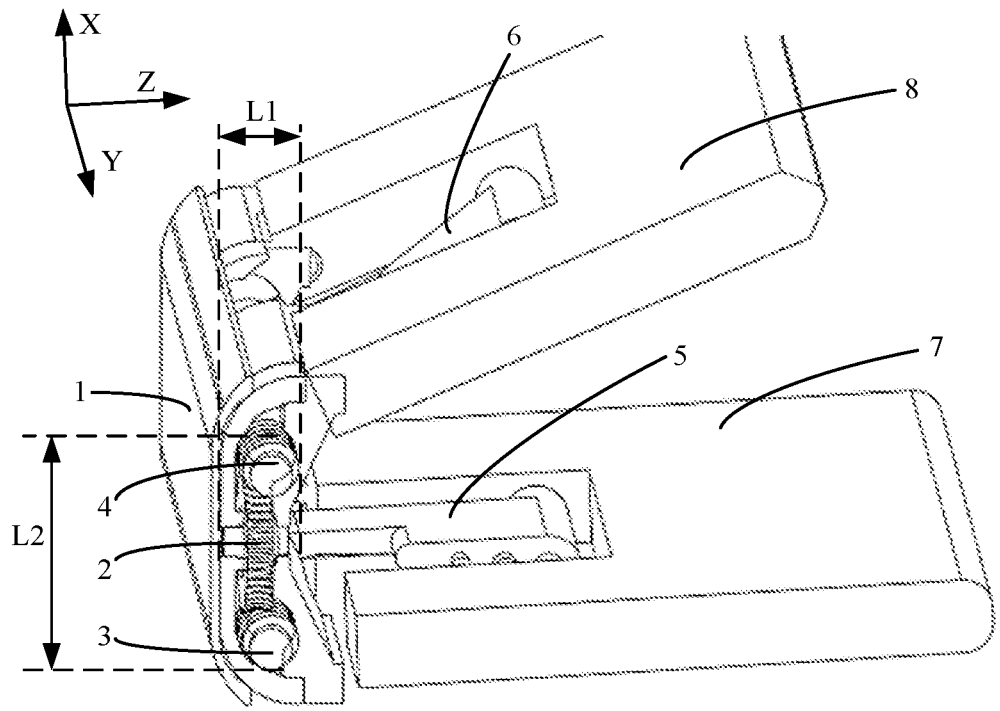
FIG. 3 is a schematic diagram of a foldable terminal according to an embodiment of this application.

Specifically, referring to FIG. 3, for the foldable terminal, space in a Z direction (a thickness direction when the foldable terminal is unfolded, that is, a direction corresponding to L1 in FIG. 3) is tightest, space in an X direction (a thickness direction when the foldable terminal is folded, that is, a direction corresponding to L2 in FIG. 3) is less tight, and space in a Y direction (a length direction of the foldable terminal) is relatively abundant.

The foldable terminal in the related art adopts four gears meshed with each other as a transmission mechanism, so that the two bodies rotate synchronously. A Z-direction size of the foldable terminal occupied by the transmission mechanism is at least a radial size of one gear, an X-direction size of the foldable terminal occupied by the transmission mechanism is a sum of radial sizes of the four gears, and a Y-direction size of the foldable terminal occupied by the transmission mechanism is an axial size of the gear (or the thickness of the gear). Since the radial size of the gear is relatively large and the axial size is relatively small, the transmission mechanism in the related art occupies relatively large Z-direction space and X-direction space, and saves useless Y-direction space.

The synchronization mechanism provided in the embodiments of this application adopts the transmission mechanism of double worms+worm gear. As shown in FIG. 3, a Z-direction size of the foldable terminal occupied by the transmission mechanism of double worms+worm gear is L1 in FIG. 3, an X-direction size of the foldable terminal occupied by the transmission mechanism is L2 in FIG. 3, and a Y-direction size of the foldable terminal occupied by the transmission mechanism is the axial size of the worm. Since the axial size of the worm gear 2 and the radial sizes of the first worm 3 and the second worm 4 are small, L1 and L2 are both small, and the synchronization mechanism occupies small Z-direction space and X-direction space, which is conducive to the light and thin design of the foldable terminal.

Figure 4:
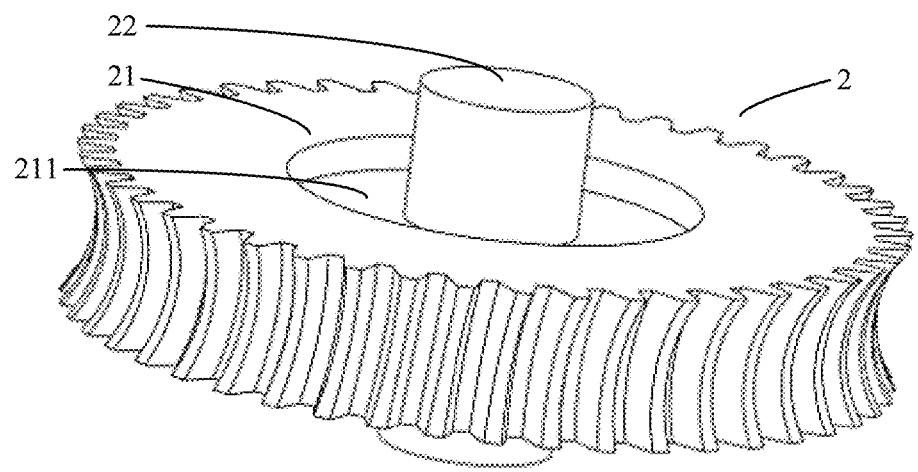
FIG. 4 is a schematic diagram of a worm gear according to an embodiment of this application.

The components involved in the synchronization mechanism provided in the embodiments of this application are described below:

The worm gear 2 is configured to transmit motion between the first worm 3 and the second worm 4, and plays a role of synchronizing the rotation of the first worm 3 and the second worm 4. The structure and the mounting manner of the worm gear 2 provided in the embodiments of this application are exemplarily described below with reference to FIG. 4 to FIG. 8:

As shown in FIG. 4, the worm gear 2 includes a worm gear body portion 21 and a rotating shaft portion 22. The rotating shaft portion 22 is coaxially and fixedly connected to the worm gear body portion 21, and two ends of the rotating shaft portion 22 protrude relative to two sides of the worm gear body portion 21. The two ends of the rotating shaft portion 22 are rotatably connected to the base 1 respectively.

The worm gear 2 provided in the embodiments of this application may be integrally formed. The worm gear body portion 21 and the rotating shaft portion 22 are fixedly connected, to facilitate the miniaturized design of the worm gear 2, which is more conducive to saving the space occupied by the worm gear 2.

Figure 5:
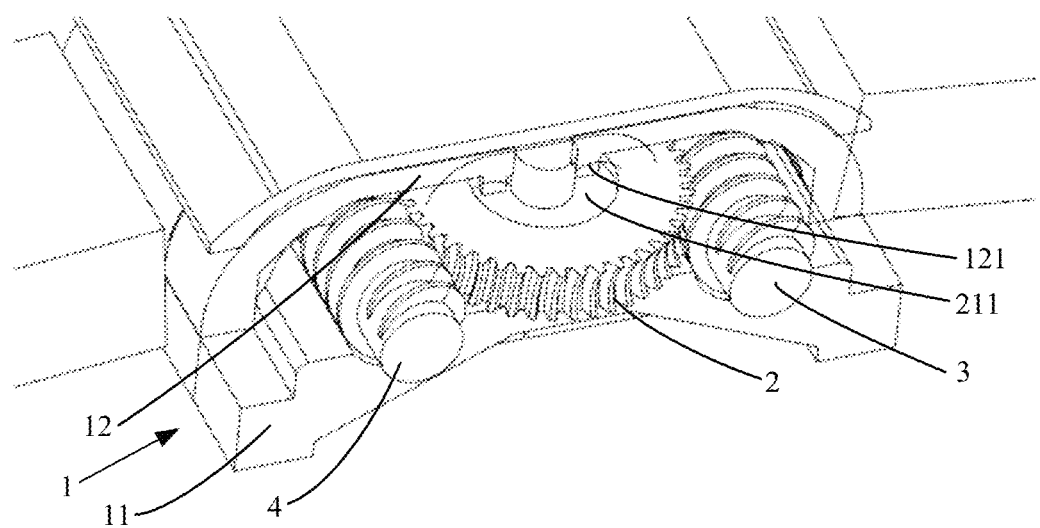
FIG. 5 is a schematic diagram of mounting of a worm gear according to an embodiment of this application.

As shown in FIG. 5, the base 1 may include a pedestal 11 and a shaft cover 12, and the pedestal 11 is fixedly connected to the shaft cover 12. The worm gear body portion 21 is located between the pedestal 11 and the shaft cover 12, and the two ends of the rotating shaft portion 22 are rotatably connected to the pedestal 11 and the shaft cover 12 respectively. Specifically, opposite sides of the pedestal 11 and the shaft cover 12 are respectively provided with rotating shaft holes, and two ends of the rotating shaft portion 22 are respectively located in the two rotating shaft holes.

As shown in FIG. 4 and FIG. 5, an annular groove 211 is provided on a side of the worm gear body portion 21 facing the shaft cover 12, the annular groove 211 is coaxial with the rotating shaft portion 22, an annular flange 121 is provided on a side of the shaft cover 12 facing the worm gear body portion 21, and the annular flange 121 is located in the annular groove 211.

The annular groove 211 is provided on the worm gear body portion 21, the annular flange 121 is provided on the shaft cover 12, and the annular flange 121 is located in the annular groove 211, so that a side of the worm gear 2 facing the shaft cover 12 is axially limited.

Moreover, this limiting manner further saves the thickness space of the body while ensuring the minimum thickness of the shaft cover 12. It should be noted that, in addition to the foregoing limiting manner, a groove may alternatively be provided on the shaft cover 12, a protrusion may be provided on the side of the worm gear body portion 21 facing the shaft cover 12, and the groove and the protrusion are matched for limiting. This is not limited in the embodiments of this application.

Figure 6:
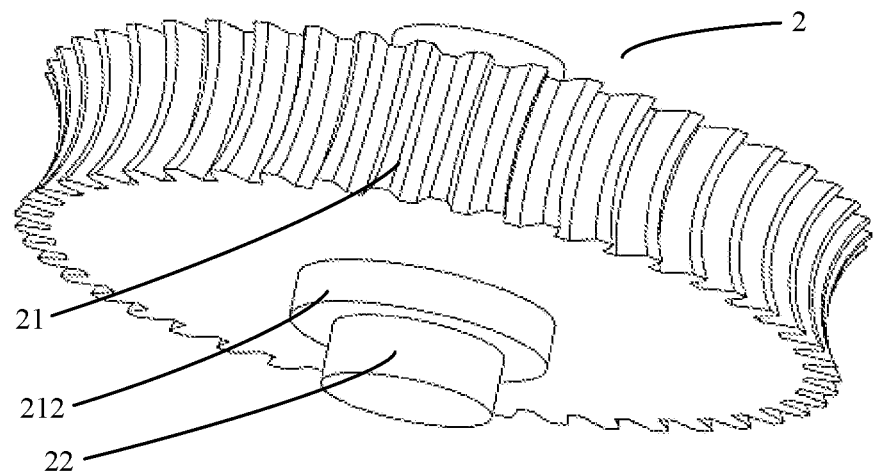
FIG. 6 is a schematic diagram of a worm gear according to an embodiment of this application.
Figure 7:
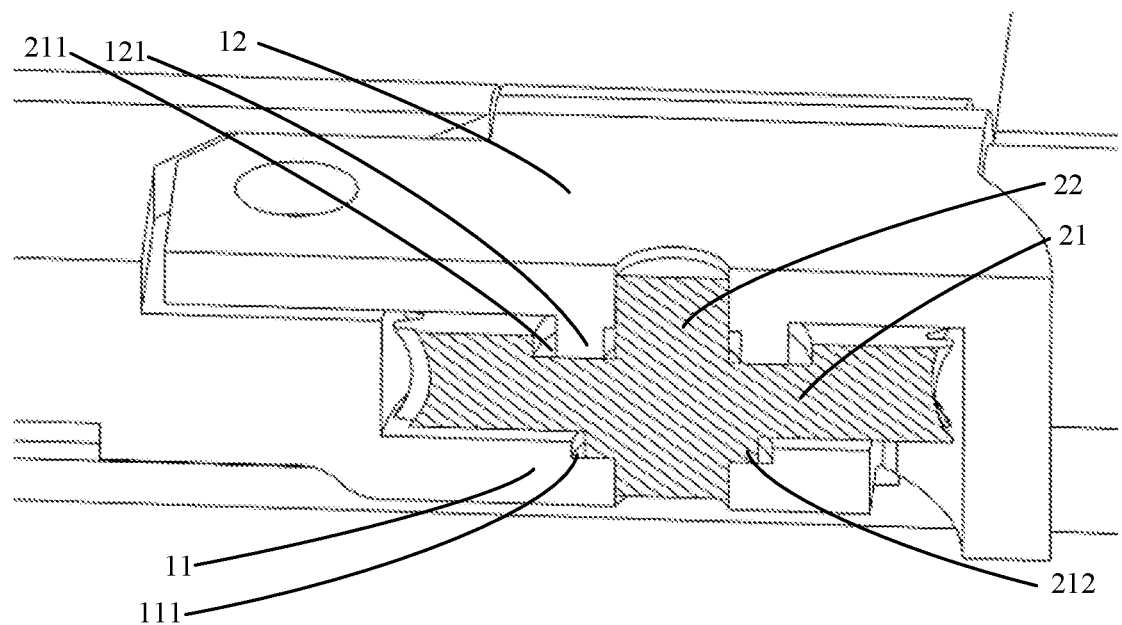
FIG. 7 is a schematic diagram of mounting of a worm gear according to an embodiment of this application.

As shown in FIG. 6 and FIG. 7, a boss 212 is provided on a side of the worm gear body portion 21 facing the pedestal 11, the boss 212 is coaxial with the rotating shaft portion 22, a limiting groove 111 is provided on a side of the pedestal 11 facing the worm gear body portion 21, and the boss 212 is located in the limiting groove 111.

In practical applications, since the annular groove 211 is provided on the side of the worm gear body portion 21 facing the shaft cover 12, in order to avoid further weakening the strength of the worm gear 2, and considering that the thickness of the pedestal 11 is generally large, the boss 212 may be provided on the side of the worm gear body portion 21 facing the pedestal 11, the limiting groove 111 is provided on the pedestal 11, and the boss 212 is located in the limiting groove 111, to axially limit a side of the worm gear 2 facing the pedestal 11. Certainly, a limiting boss may alternatively be provided on the pedestal 11, a limiting groove may be provided on the side of the worm gear body portion 21 facing the pedestal 11, and the limiting boss and the limiting groove are matched for limiting.

The first worm 3 and the second worm 4 are both meshed with the worm gear 2. Under the action of the worm gear 2, the first worm 3 and the second worm 4 rotate synchronously, and drive the first rotating component 5 and the second rotating component 6 to rotate synchronously.

Figure 8:
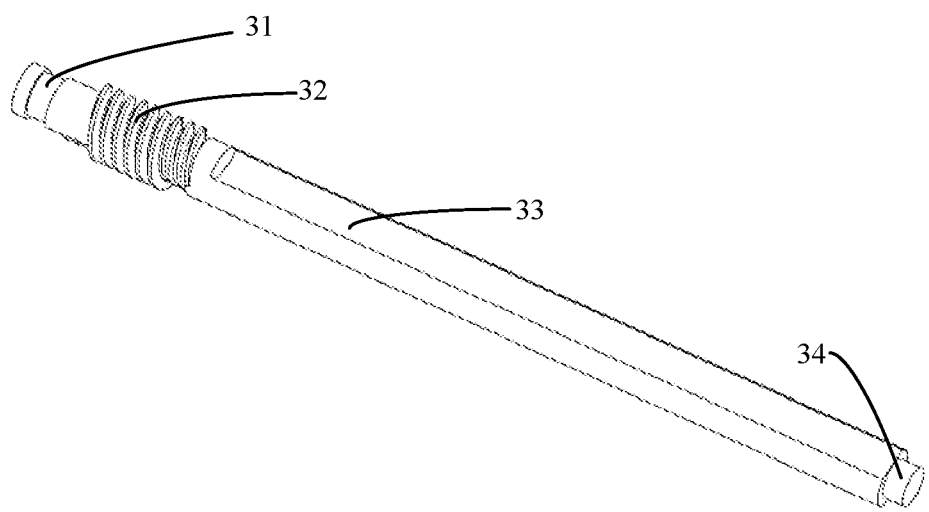
FIG. 8 is a schematic diagram of a worm according to an embodiment of this application.

The structure and the mounting manner of the first worm 3 and the second worm 4 are exemplarily described below with reference to FIG. 8:

As shown in FIG. 8, the first worm 3 and the second worm 4 each include a first rotating connection portion 31, a spiral portion 32, a non-circular shaft portion 33, and a second rotating connection portion 34 that are sequentially connected. The first rotating connection portion 31 and the second rotating connection portion 34 are rotatably connected to the base 1 respectively, the spiral portion 32 is meshed with the worm gear 2, and the non-circular shaft portion 33 is fixedly connected to the first rotating component 5 or the second rotating component 6.

The non-circular shaft portion 33 refers to a shaft segment with a non-circular cross-sectional shape. The non-circular shaft portion 33 is arranged, to facilitate the circumferential limit of the first worm 3 and the first rotating component 5, and the circumferential limit of the second worm 4 and the second rotating component 6. A manner in which the first worm 3 is fixedly connected to the first rotating component 5 may be the same as a manner in which the second worm 4 is fixedly connected to the second rotating component 6. The manner in which the first worm 3 is fixedly connected to the first rotating component 5 is described below as an example.

The first rotating component 5 may be sleeved on the non-circular shaft portion 33 of the first worm 3, and a corresponding through hole of the first rotating component 5 matches the shape of the non-circular shaft portion 33, so that the first rotating component 5 and the non-circular shaft portion 33 are formed and connected, and the first rotating component 5 is circumferentially fixed on the first worm 3.

One end of the first rotating component 5 is pressed against a side of the spiral portion 32, and the other end may be limited by a retaining ring, so that the first rotating component 5 is axially fixed on the first worm 3.

The base 1 is configured for mounting the worm gear 2, the first worm 3, and the second worm 4, and there may be various specific implementations, which is not limited in the embodiments of this application. The base 1 is exemplarily described below with reference to FIG. 9.

Figure 9:
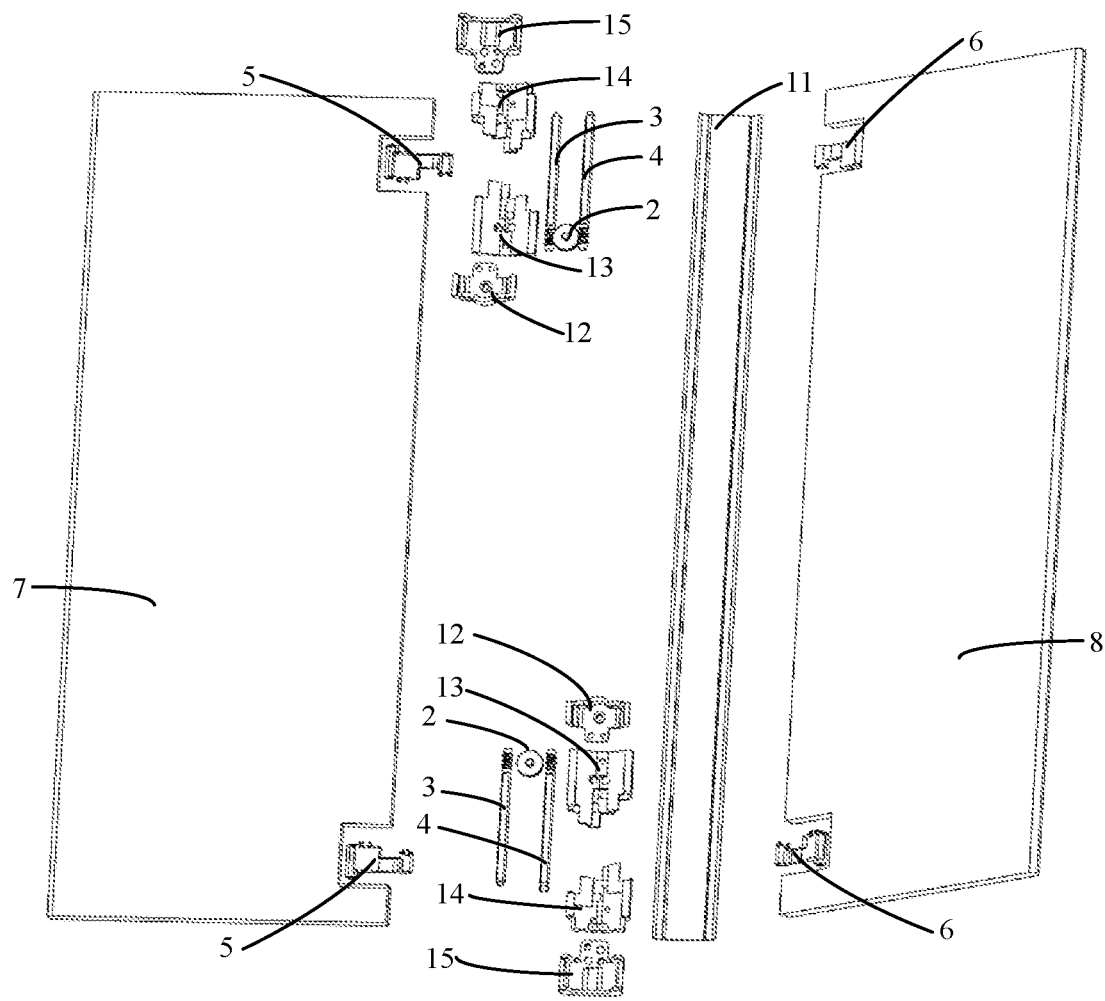
FIG. 9 is an exploded view of a foldable terminal according to an embodiment of this application.

As shown in FIG. 9, the base 1 includes a pedestal 11, a shaft cover 12, a first worm shaft seat 13, a second worm shaft seat 14, and an end cover 15.

The pedestal 11 is fixedly connected to the shaft cover 12, the worm gear body portion 21 of the worm gear 2 is located between the pedestal 11 and the shaft cover 12, and the two ends of the rotating shaft portion 22 of the worm gear 2 are rotatably connected to the shaft cover 12 and the pedestal 11 respectively.

The first worm shaft seat 13 and the second worm shaft seat 14 are both fixed on the pedestal 11, the first rotating connection portions 31 of the first worm 3 and the second worm 4 are rotatably connected to the first worm shaft seat 13, and the second rotating connection portions 32 of the first worm 3 and the second worm 4 are rotatably connected to the second worm shaft seat 14.

The end cover 15 is fixed to an end portion of the pedestal 11 for sealing the end portion of the pedestal 11.

When the synchronization mechanism is used in the foldable terminal, a plurality of synchronization mechanisms may be used. As shown in FIG. 9, the plurality of synchronization mechanisms may share the same pedestal 11. There are a plurality of worm gears 2, first worms 3, and second worms 4, and there are also a plurality of shaft covers 12, first worm shaft seats 13, and second worm shaft seats 14.

The synchronization mechanism provided in the embodiments of this application adopts the first worm 3, the worm gear 2, and the second worm 4 as the transmission mechanism, so that the first rotating component 5 and the second rotating component 6 rotate synchronously. However, on a transmission route of the first worm 3, the worm gear 2, and the second worm 4, there is a case that the worm gear 2 acts as a driving element to drive the first worm 3 or the second worm 4. Therefore, the transmission mechanism may be self-locked, causing the transmission route to be interrupted. An intuitive consequence is that when the first rotating component 5 or the second rotating component 6 is driven alone, the entire synchronization mechanism is stuck.

To ensure that the synchronization mechanism is not self-locked, in the embodiments of this application, the spiral angles of the first worm 3 and the second worm 4 are limited between the first angle threshold and the second angle threshold, so that the first rotating component 5 and the second rotating component 6 can rotate synchronously relative to the base 1 in any working condition.

Figure 10:
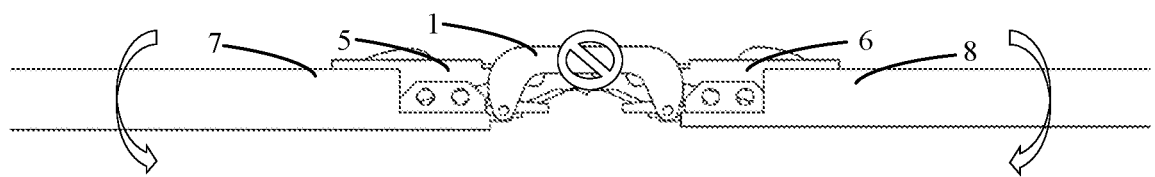
FIG. 10 is a schematic diagram of a synchronization mechanism in a first working condition according to an embodiment of this application.

Three possible working conditions of the synchronization mechanism are analyzed below with reference to FIG. 10 to FIG. 13:

In a first working condition, as shown in FIG. 10, the first rotating component 5 and the second rotating component 6 are rotated by a driving force simultaneously (the user may respectively drive, through the first body 7 and the second body 8, the first rotating component 5 and the second rotating component 6 to rotate). In this working condition, the worm gear 2 only rotates as a driven member. Therefore, self-locking does not occur.

Figure 11:
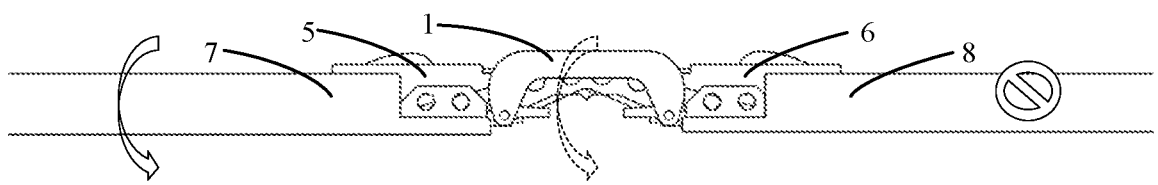
FIG. 11 is a schematic diagram of a synchronization mechanism in a second working condition according to an embodiment of this application.

In a second working condition, as shown in FIG. 11, the base 1 is not fixed, one of the first rotating component 5 and the second rotating component 6 is fixed, and the other is rotated by a driving force.

In an example where the first rotating component 5 is rotated by a driving force and the second rotating component 6 is fixed, the first rotating component 5 drives the first worm 3 to rotate, and the first worm 3 drives the worm gear 2 to rotate. Since the second rotating component 6 is fixed, the worm gear 2 cannot drive the second worm 4 to rotate, but drives the base 1 to rotate around the second worm 4 during rotation, thereby implementing the synchronous rotation of the first rotating component 5 and the second rotating component 6 relative to the base 1. The intuitive expression of the synchronization mechanism in the second working condition is that the first rotating component 5 drives the base 1 to rotate around the second rotating component 6 during rotation.

Figure 14:
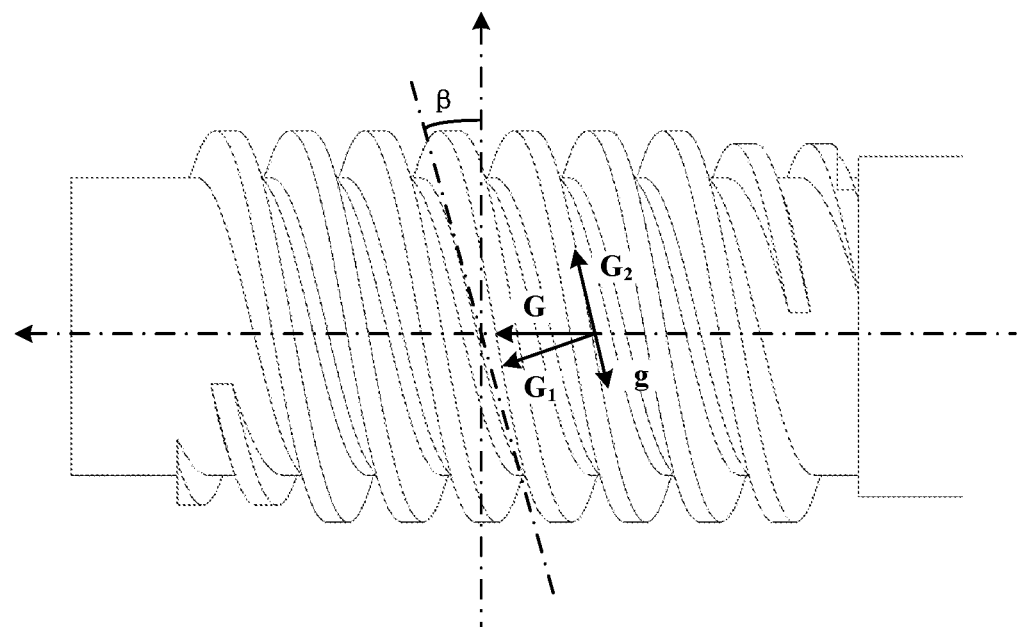
FIG. 14 is a schematic diagram of stress analysis of a worm according to an embodiment of this application.

Since there is a case that the worm gear 2 revolves around the worm in the second working condition, self-locking may occur. According to a theoretical calculation, a condition that self-locking does not occur is $$\beta < \tan^{-1}\frac{1}{\mu},$$

where β is a spiral angle (as shown in FIG. 14), and μ is a friction coefficient.

Figure 12:
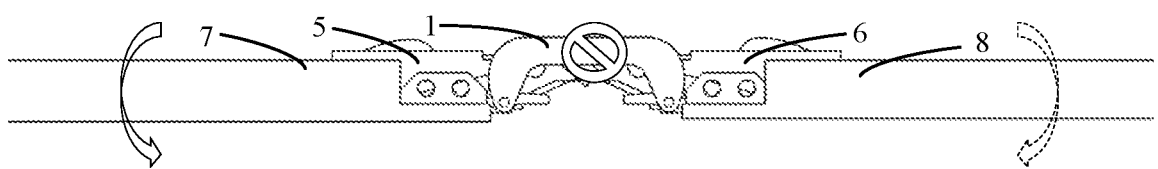
FIG. 12 is a schematic diagram of a synchronization mechanism in a third working condition according to an embodiment of this application.

In a third working condition, as shown in FIG. 12, the base 1 is fixed, and any one of the first rotating component 5 or the second rotating component 6 is rotated by a driving force.

In an example where the first rotating component 5 is rotated by a driving force, the first rotating component 5 drives the first worm 3 to rotate, the first worm 3 drives the worm gear 2 to rotate, the worm gear 2 drives the second worm 4 to rotate, and the second worm 4 drives the second rotating component 6 to rotate, thereby implementing the synchronous rotation of the first rotating component 5 and the second rotating component 6 relative to the base 1.

Since there is a case that the worm gear 2 drives the worm in the third working condition, self-locking may occur. According to a theoretical calculation, a condition that self-locking does not occur is $\beta > \tan^{-1}\mu$, where β is a spiral angle (as shown in FIG. 14), and μ is a friction coefficient.

It is assumed that a friction coefficient μ of a metal material selected for the worm gear 2, the first worm 3, and the second worm 4 is between 0.15 and 0.2, μ is substituted into the foregoing two formulas to obtain 8.53°<β<78.67°, that is, the first angle threshold is 8.53°, and the second angle threshold is 78.67°.

Figure 13:
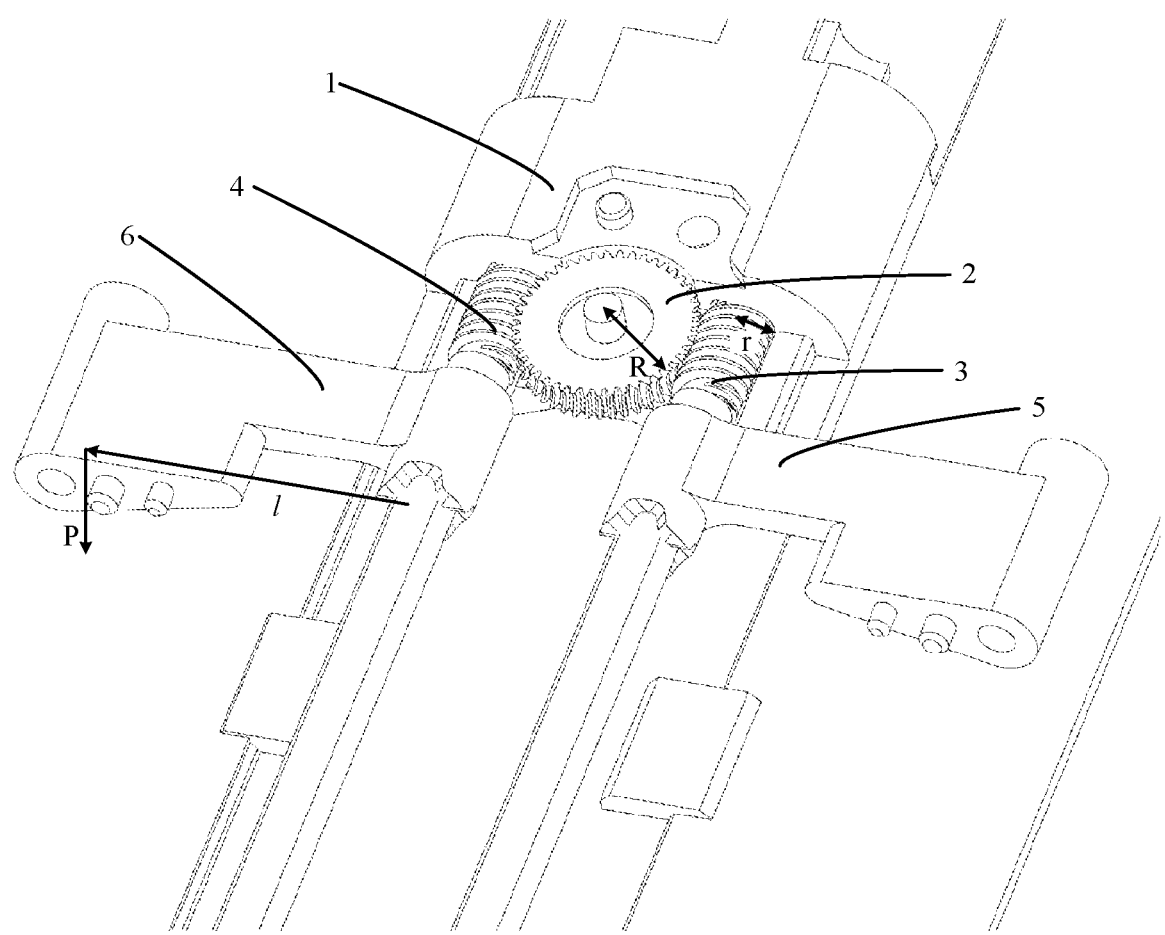
FIG. 13 is a schematic diagram of stress analysis of a worm according to an embodiment of this application.

Further, to improve the force experience for the user and avoid an excessive driving force with which the user drives the first rotating component 5 and/or the second rotating component 6, the spiral angles of the worm gear 2, the first worm 3, and the second worm 4 may be further limited (which are limited between a third angle threshold and the second angle threshold). Since the driving force that the user needs to apply is the largest in the third working condition, stress analysis of the synchronization mechanism in the third working condition is carried out:

Referring to FIG. 13 and FIG. 14, the press analysis is as follows. In the formulas, p is the driving force applied by the user, l is a moment length of the first rotating component 5 or the second rotating component 6, n is a transmission efficiency of the worm gear and the worm, R is a reference circle radius of the worm gear, r is a reference circle radius of the first worm 3 or the second worm 4, μ is a friction coefficient, and β is a spiral angle.

Worm gear thrust:

$$G = \frac{pl \cdot \eta}{R};$$

positive pressure:

$$G_1 = \frac{pl \cdot \eta}{R}\cos\beta;$$

friction:

$$g = \mu G_1 = \mu\frac{pl \cdot \eta}{R}\cos\beta;$$

tangential force:

$$G_2 = \frac{pl \cdot \eta}{R}\sin\beta;$$

and
$G_2 - g > T$, where T is a measured resistance. $G_2 - g > T$ is substituted to obtain $$\frac{pl \cdot \eta}{R}\sin\beta - \mu\frac{pl \cdot \eta}{R}\cos\beta > T,$$

which is simplified as $$\beta > \tan^{-1}\frac{TR}{\eta pl\sqrt{1+\mu^2}} + \sin^{-1}\frac{\mu}{\sqrt{1+\mu^2}}.$$

If a maximum force P of the user is not greater than 5N (about the weight of 10 eggs), a friction coefficient is 0.15, and a measured resistance torque TR is 6N·mm, then β >17.01°, that is, the third angle threshold is 17.01°.

It may be understood that, since the driving force that the user needs to apply is the largest in the third working condition, while ensuring that the driving force applied by the user in the third working condition is less than 5N, the driving forces applied by the user in the first working condition and the second working condition are also less than 5N.

Therefore, in the synchronization mechanism provided in the embodiments of this application, the worm gear 2, the first worm 3, and the second worm 4 adopt a structure with the spiral angles thereof being greater than 17.01° and less than 78°, which can implement arbitrary rotation of the synchronization mechanism in the foregoing three working conditions, and is conducive to increasing the transmission efficiency and improving the handfeel experience for the user.

Further, considering the manufacturability and the handfeel experience comprehensively, the spiral angle used in the embodiments of this application may be 25°, and the first worm 3 and the second worm 4 may be three-end worms, but is not limited thereto, for example, may alternatively be single-end worms or double-end worms.

It should be further noted that, that the worm gear 2 is a cylindrical worm gear, and the first worm 3 and the second worm 4 are cylindrical worms is merely used as an example to illustrate the synchronization mechanism. In practical applications, the worm gear 2 may alternatively be a conical worm gear or a toroidal worm gear, and the first worm 3 and the second worm 4 may alternatively be conical worms or toroidal worms.

Figure 15:
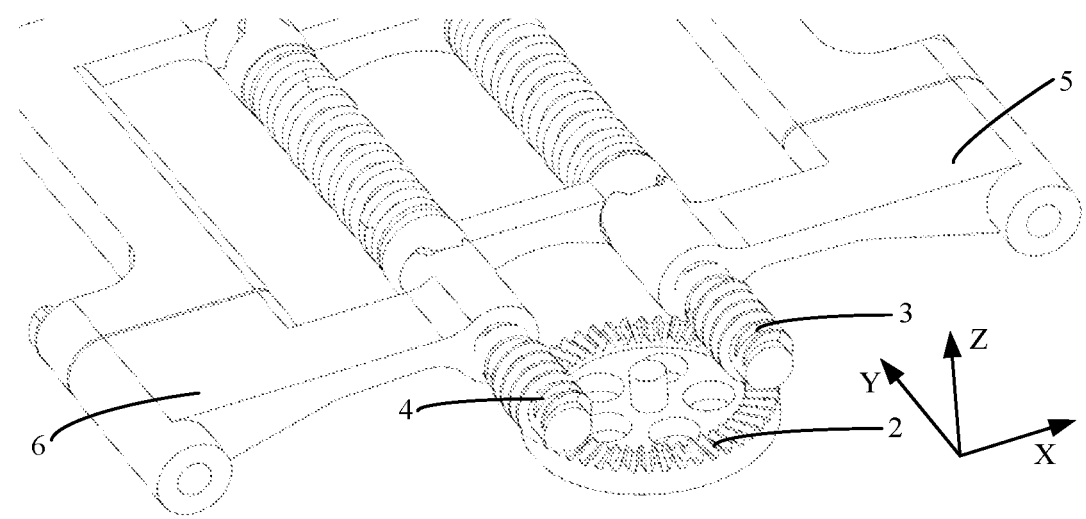
FIG. 15 is a schematic diagram of a synchronization mechanism according to an embodiment of this application.

For example, as shown in FIG. 15, the worm gear 2 in the synchronization mechanism is a conical worm gear, gear teeth of the worm gear 2 are located on an end face of the worm gear 2, and the first worm 2 and the second worm 3 are conical worms, and are respectively meshed with the gear teeth on the end face of the worm gear 2. For this transmission mechanism of double worms+worm gear, a Z-direction size of the foldable terminal occupied is a sum of an axial size of the worm gear 2 and a radial size of the worm, an X-direction size of the foldable terminal occupied is a farthest distance between the first worm 3 and the second worm 4, and a Y-direction size of the foldable terminal occupied is an axial size of the worm. Since the sum of the axial size of the worm gear 2 and the radial size of the worm is smaller than the radial size of the gear, the synchronization mechanism provided in the embodiments of this application occupies small Z-direction space, and moreover, the distance between the first worm 3 and the second worm 4 is less than a sum of radial sizes of four gears, so that the synchronization mechanism further occupies less X-direction space.

The synchronization mechanism provided in the embodiments of this application includes at least the following beneficial effects:

Firstly, the transmission manner of double worms+worm gear is adopted, so that the synchronization mechanism is in a flat state as a whole, and is consistent with the unfolded shape of the foldable terminal, which is conducive to the light and thin design of the foldable terminal.

Secondly, the worm gear 2 is mounted between the pedestal 11 and the shaft cover 12, the shaft cover 12 is machined with the annular flange 121, the worm gear 2 is machined with the annular groove 211, and the annular flange 121 matches the annular groove 211 to implement the Z-direction limit of the worm gear 2, which further saves the Z-direction space of the foldable terminal.

Thirdly, based on theoretical analysis, a large spiral angle greater than 17.01° and less than 78.67° is adopted, which avoids the risk of self-locking of the synchronization mechanism, and can implement arbitrary rotation by the user during use. In addition, the handfeel experience for the user is better.

The embodiments of this application further provide a foldable terminal. As shown in FIG. 1, the foldable terminal includes a first body 7, a second body 8, a flexible screen (not shown in the figure), and the synchronization mechanism provided in the embodiments of this application. The first body 7 and the second body 8 are respectively connected to the first rotating component 5 and the second rotating component 6 in the synchronization mechanism. The flexible screen covers the first body 7 and the second body 8.

The foldable terminal provided in the embodiments of this application may be a foldable mobile phone, a foldable tablet computer, or a foldable notebook computer, but is not limited thereto.

The first rotating component 5 and the second rotating component 6 may be alternatively referred to as a first swing arm and a second swing arm.

According to the solutions in the embodiments of this application, the synchronization mechanism provided in the embodiments of this application is applied to the foldable terminal, which is conducive to the light and thin design of the foldable terminal.

To implement more stable transmission between the first body 7 and the second body 8, a plurality of synchronization mechanisms may be included in the foldable terminal. Axes of the first worms 3 in the plurality of synchronization mechanisms are all collinear, and axes of the second worms 4 in the plurality of synchronization mechanisms are all collinear. The first rotating components 5 in the plurality of synchronization mechanisms are all connected to the first body 7, and the second rotating components 6 in the plurality of synchronization mechanisms are all connected to the second body 8.

For example, as shown in FIG. 9, the foldable terminal may include two synchronization mechanisms, and the two synchronization mechanisms share a pedestal 11. The pedestal 11 may be strip-shaped. The two synchronization mechanisms are arranged along a length direction of the pedestal 11, and are respectively close to two ends of the pedestal 11.

It should be noted that, rotation axes of the first body 7 and the first rotating component 5 (or the second body 8 and the second rotating component 6) in the foldable terminal may be collinear or may be not collinear, which is not limited in the embodiments of this application.

When the rotation axes are collinear, the connection between the first body 7 and the first rotating component 5 may be a fixed connection, and the connection between the second body 8 and the second rotating component 6 may also be a fixed connection. The first body 7 and the second body 8 rotate respectively with the first worm 3 and the second worm 4.

When the rotation axes are not collinear, the connection between the first body 7 and the first rotating component 5 is a movable connection, and the connection between the second body 8 and the second rotating component 6 is also a movable connection. When any one of the first body 7 or the first rotating component 5 rotates, the other can be driven to rotate; and when any one of the second body 8 or the second rotating component 6 rotates, the other can be driven to rotate. For example, the foregoing movable connection may be a connection through a four-bar mechanism.

Terms used in implementations of this application are merely used to explain the embodiments of this application, but are not intended to limit this application. Unless otherwise defined, a technical term or a scientific term used in the implementations of this application is to have a general meaning understood by a person of ordinary skill in the art of this application. "First", "second" and similar terms used in the specification and the claims of this application do not indicate any sequence, quantity, or importance, but are only used to distinguish different components. Similarly, "one", "a", and similar terms also do not indicate a quantity limitation, but indicates that there is at least one. "Including" and similar terms mean that elements or articles appearing before "including" cover listed elements or articles appearing after "including" and equivalents thereof, and do not exclude other elements or articles. The term "connection" should be understood in a broad sense. The connection may be a fixing connection, a detachable connection, or an integral connection, or may be a direct connection, or an indirect connection by using an intermediary.

The foregoing descriptions are merely optional embodiments of this application, but are not intended to limit this application. Any modification, equivalent replacement, or improvement made within the principle of this application shall fall within the protection scope of this application.

What is claimed is:

1. A synchronization mechanism, comprising:
   a base;
   a worm gear;
   a first worm;
   a second worm;
   a first rotating component; and
   a second rotating component,
   wherein the worm gear, the first worm, and the second worm are rotatably connected to the base, and the first worm and the second worm are parallel and are both meshed with the worm gear;
   wherein the first rotating component is fixedly connected to the first worm, and the second rotating component is fixedly connected to the second worm;
   wherein the worm gear, the first worm, and the second worm are configured to enable the first rotating component and the second rotating component to rotate synchronously relative to the base;
   wherein spiral angles of the worm gear, the first worm, and the second worm are greater than a first angle threshold and less than a second angle threshold, to enable the first rotating component and the second rotating component to rotate synchronously relative to the base regardless of whether the synchronization mechanism is in a first working condition, a second working condition, or a third working condition;
   wherein the first working condition is a working condition in which the first rotating component and the second rotating component are simultaneously rotated by a driving force, the second working condition is a working condition in which the base is not fixed, one of the first rotating component and the second rotating component is fixed, and the other is rotated by a driving force, and the third working condition is a working condition in which the base is fixed, and any one of the first rotating component or the second rotating component is rotated by a driving force; and
   wherein the first angle threshold is 8.63°, and the second angle threshold is 78.67°.

2. The synchronization mechanism according to claim 1, wherein the worm gear comprises a worm gear body portion and a rotating shaft portion;
   wherein the rotating shaft portion is coaxially and fixedly connected to the worm gear body portion, and two ends of the rotating shaft portion protrude relative to two sides of the worm gear body portion; and
   wherein the two ends of the rotating shaft portion are rotatably connected to the base.

3. The synchronization mechanism according to claim 2, wherein the base comprises a pedestal and a shaft cover, and the pedestal is fixedly connected to the shaft cover; and
   wherein the worm gear body portion is located between the pedestal and the shaft cover, and the two ends of the rotating shaft portion are rotatably connected to the pedestal and the shaft cover, respectively.

4. The synchronization mechanism according to claim 3, wherein a boss is provided on a side of the worm gear body portion facing the pedestal, the boss is coaxial with the rotating shaft portion, a limiting groove is provided on a side of the pedestal facing the worm gear body portion, and the boss is located in the limiting groove.

5. The synchronization mechanism according to claim 1, wherein each of the first worm and the second worm comprises a first rotating connection portion, a spiral portion, a non-circular shaft portion, and a second rotating connection portion that are sequentially connected; and
   wherein the first rotating connection portion and the second rotating connection portion are rotatably connected to the base, the spiral portion is meshed with the worm gear, and the non-circular shaft portion is fixedly connected to the first rotating component or the second rotating component.

6. The synchronization mechanism according to claim 1, wherein the spiral angles of the worm gear, the first worm, and the second worm are greater than a third angle threshold and less than the second angle threshold, so that a driving force during rotation of the first rotating component or the second rotating component is less than a set value in the first working condition, the second working condition, or the third working condition, wherein the third angle threshold is greater than the first angle threshold.

7. The synchronization mechanism according to claim 6, wherein the third angle threshold is 17.01°.

8. A foldable terminal, comprising:
   a first body;
   a second body;
   a flexible screen; and
   the synchronization mechanism according to claim 1,
   wherein the first body and the second body are connected to the first rotating component and the second rotating component in the synchronization mechanism; and
   wherein the flexible screen covers the first body and the second body.

9. The foldable terminal according to claim 8, wherein there are a plurality of synchronization mechanisms;
   wherein axes of the first worms in the plurality of synchronization mechanisms are all collinear, and axes of the second worms in the plurality of synchronization mechanisms are all collinear; and
   wherein the first rotating components in the plurality of synchronization mechanisms are all connected to the first body, and the second rotating components in the plurality of synchronization mechanisms are all connected to the second body.

10. The synchronization mechanism according to claim 3, wherein an annular groove is provided on a side of the worm gear body portion facing the shaft cover, the annular groove is coaxial with the rotating shaft portion, an annular flange is provided on a side of the shaft cover facing the worm gear body portion, and the annular flange is located in the annular groove.

* * * * *